US012703843B2

(12) United States Patent
Havel et al.

(10) Patent No.: US 12,703,843 B2
(45) Date of Patent: Aug. 11, 2026

(54) METHOD AND SYSTEM FOR THE FILTRATION AND STABILIZATION OF ULTRA-HIGH GRAVITY ALCOHOLIC BEVERAGES

(71) Applicant: Porifera, Inc., San Leandro, CA (US)

(72) Inventors: Frederik Havel, Beaconsfield (CA); David Durkee, Lakewood, CO (US)

(73) Assignee: Porifera, Inc., San Leandro, CA (US)

(*) Notice: Subject to any disclaimer, the term of this patent is extended or adjusted under 35 U.S.C. 154(b) by 596 days.

(21) Appl. No.: 17/603,101

(22) PCT Filed: Apr. 10, 2020

(86) PCT No.: PCT/US2020/027731
§ 371 (c)(1),
(2) Date: Oct. 12, 2021

(87) PCT Pub. No.: WO2020/214501
PCT Pub. Date: Oct. 22, 2020

(65) Prior Publication Data

US 2022/0186162 A1 Jun. 16, 2022

Related U.S. Application Data

(60) Provisional application No. 62/834,206, filed on Apr. 15, 2019.

(51) Int. Cl.
*C12H 1/16* (2006.01)
*B01D 39/20* (2006.01)
(Continued)

(52) U.S. Cl.
CPC ............... *C12H 1/16* (2013.01); *B01D 39/20* (2013.01); *C12C 11/11* (2013.01); *C12G 3/08* (2013.01); *C12H 6/00* (2019.02)

(58) Field of Classification Search
CPC .. C12H 1/16; C12H 6/00; B01D 39/20; C12C 11/11; C12G 3/08
See application file for complete search history.

(56) References Cited

U.S. PATENT DOCUMENTS 5,869,174 A 2/1999 Wang
2004/0026338 A1 2/2004 Biebuyck et al.
(Continued)

FOREIGN PATENT DOCUMENTS

CA 3045381 6/2018
EP 3026104 6/2016
(Continued)

OTHER PUBLICATIONS

"Membrane filter search," Millipore Sigma, archived page dated Dec. 14, 2018, retrieved from https://web.archive.org/web/20181214102040/https://www.emdMillipore.com/US/en/search/membrane+filter?Search Term=membrane+filter, 1 page.
(Continued)

*Primary Examiner* — Katherine D Leblanc
(74) *Attorney, Agent, or Firm* — Dorsey & Whitney LLP

(57) ABSTRACT

Methods and systems are described that filter and stabilize ultra-high gravity alcoholic beverages produced by forward osmosis. A rough ultra-high gravity alcoholic beverage may be received from a dewatering system and then passed on to a chiller as part of a post dewatering process. The ultra-high gravity alcoholic beverage may be held at a predetermined temperature for a specific amount of time such that the temperature of the ultra-high gravity alcoholic beverage is prevented from falling below a freezing point of the ultra-high gravity alcoholic beverage. The chilled ultra-high gravity alcoholic beverage is then passed through a number of filters of a filtration system. The filters may be arranged in an order progressing from coarse to fine filters, where haze compounds and their precursors are removed from the (Continued)

ultra-high gravity alcoholic beverage producing a clear and stable product.

11 Claims, 6 Drawing Sheets

(51) Int. Cl.

| | |
|---|---|
| ***C12C 11/11*** | (2019.01) |
| ***C12G 3/08*** | (2006.01) |
| ***C12H 6/00*** | (2019.01) |

(56) References Cited

U.S. PATENT DOCUMENTS

| | | | |
|---|---|---|---|
| 2010/0009031 | A1 | 1/2010 | Nguyen et al. |
| 2014/0224716 | A1 | 8/2014 | Hancock et al. |
| 2016/0230133 | A1 | 8/2016 | Peterson et al. |
| 2017/0049918 | A1 | 2/2017 | Wang et al. |

FOREIGN PATENT DOCUMENTS

| | | | |
|---|---|---|---|
| EP | 3252136 | A1 | 12/2017 |
| EP | 3330361 | | 6/2018 |
| GB | 2294944 | | 5/1996 |
| JP | 2001-509431 | | 7/2001 |
| JP | 2009-542238 | | 11/2007 |
| WO | 2016160810 | A1 | 10/2016 |
| WO | 2016210337 | A3 | 12/2016 |
| WO | WO 2018/200538 | | 11/2018 |
| WO | WO 2018/237015 | | 12/2018 |
| WO | 2020214501 | A1 | 10/2020 |

OTHER PUBLICATIONS

International Preliminary Report on Patentability for International (PCT) Application No. PCT/US2020/027731, dated Oct. 28, 2021, 9 pages.

Miyachi, "Beer Brewing Technology, 1st Edition," Shokuhin Sangyo Shimbunsha Co. Ltd., Dec. 28, 1999, pp. 335-346 (no translation available; see drawings).

Notice of Allowance for Australia Patent Application No. 2020258360, dated Oct. 28, 2022, 4 pages.

Extended European Search Report for European Patent Application No. 20792096.8, dated Nov. 17, 2022, 11 pages.

Official Action for United Kingdom Patent Application No. 2113133.9, dated Nov. 1, 2022, 3 pages.

Official Action (with English translation) for Japan Patent Application No. 2021-560845, dated Nov. 8, 2022, 7 pages.

International Search Report and Written Opinion prepared by the U.S. Patent and Trademark Office for International (PCT) Patent Application No. PCT/US2020/027731, dated Jun. 1, 2020, 17 pages.

"Office Action and Translation for KR10-2021-7036728, mailed on Dec. 20, 2023".

Official Action for Australia Patent Application No. 2020258360, dated Jul. 18, 2022, 6 pages.

Official Action for Canada Patent Application No. 3131867, dated Jun. 7, 2022, 3 pages.

Official Action for United Kingdom Patent Application No. 2113133.9, dated Jun. 30, 2022, 5 pages.

Official Action for Panama Patent Application No. 93660-01, dated Jul. 19, 2022, 4 pages.

"Final Rejection for Korean Patent Appln. No. 2021-7036728, mailed on Aug. 28, 2024".

"Final Rejection for Korean Patent Appln. No. 2021-7036728, mailed on Jan. 20, 2025".

METHOD AND SYSTEM FOR THE FILTRATION AND STABILIZATION OF ULTRA-HIGH GRAVITY ALCOHOLIC BEVERAGES

CROSS REFERENCE TO RELATED APPLICATIONS

This application is a national stage application under 35 U.S.C. 371 and claims the benefit of PCT Application No. PCT/US2020/027731 having an international filing date of Apr. 10, 2020, which designated the United States, which PCT application claimed the benefit of and priority, under 35 U.S.C. § 119 (e), to U.S. Provisional Application Ser. No. 62/834,206, filed Apr. 15, 2019, entitled "Method and System for the Filtration and Stabilization of Ultra-High Gravity Alcoholic Beverages," the entire disclosures of each of which is are hereby incorporated herein by reference, in their entireties, for all that they teach and for all purposes.

FIELD

The present disclosure is generally directed to processing ultra-high gravity alcoholic beverages, in particular, toward a final filtration and stabilization of beverages such as beer, cider, and alcoholic malt bases.

BACKGROUND

Water is the major component in most beverages, including fermented malt beverages, hard cider, beer, etc., and/or other alcoholic beverages. The more water that is present, given a fixed amount of ethanol present in an alcoholic beverage, the heavier the alcoholic beverage will be. As can be appreciated, shipping or transporting these physically heavier alcoholic beverages can have negative effects on the environment and on the costs of the beverage product.

Reducing the water content of malt beverages can significantly reduce the overall weight of the product by producing a dewatered alcoholic beverage product. Due to the reduced weight of the dewatered alcoholic beverage product, the product can be efficiently transported, shipped, and stored. Once the product reaches an intended destination, and prior to consumption, the dewatered alcoholic beverage product can be reconstituted by simply adding water or, in some cases, carbonated water. Among other benefits, the production of a dewatered alcoholic beverage product can reduce the costs and environmental impact associated with transporting and storing standard, or sales gravity, alcoholic beverages and products.

BRIEF SUMMARY

In certain embodiments, the present disclosure relates to a method and system that provides a stabilized and bright ultra-high gravity (UHG) alcoholic beverage. In some embodiments, the UHG alcoholic beverage may be pre-treated, or preconditioned, prior to being dewatered. For example, it may be desired to remove dissolved oxygen from a high gravity (HG) alcoholic beverage (e.g., having an alcohol by volume (ABV) of approximately 5% to 14%, etc.) prior to dewatering it into a UHG alcoholic beverage (e.g., having approximately 24% ABV, or more). This pre-treatment can be accomplished by use of nitrogen purged fluid lines through which the HG alcoholic beverage passes. As the HG alcoholic beverage passes through the fluid lines that are purged with the nitrogen gas, dissolved oxygen is removed from the HG alcoholic beverage. Additionally or alternatively, the HG alcoholic beverage may be physically stabilized prior to being supplied to a dewatering system (e.g., a forward osmosis (FO) system, etc.). In some embodiments, the HG alcoholic beverage may be "chill proofed" prior to entering the dewatering system. In any event, physical stabilization may be obtained by the selective addition of any one or more of tannic acid, silica gels (e.g., silica xerogel, silica hydrogel, or the like), polyvinylpolypyrrolidone (PVPP) treatment, proteolytic enzyme, pectinase enzyme and/or cold treatment, holding the HG alcoholic beverage at a temperature of to −1° C. to −7° C. for a predetermined period of time, etc., and/or combinations thereof. In some embodiments, silica, PVPP, and/or nylon 66 (e.g., polyamide $(C_{12}H_{22}N_2O_2)_n$, etc.) may be used to sorb proteins, tannins, and/or other material (e.g., haze precursors, etc.) in the HG alcoholic beverage or the UHG alcoholic beverage at a temperature of approximately −1° C. to −2° C. In one embodiment, the chill proofing may include a pre-treatment comprising an enzyme treatment of the proteins in the alcoholic beverage and a depth filtration at a temperature of approximately −1° C. to −2° C.

In some embodiments, a method for filtering and stabilizing UHG alcoholic beverage is provided, comprising: receiving the UHG alcoholic beverage from a forward osmosis (FO) system; introducing the UHG alcoholic beverage into a chilled holding tank set at a temperature within a range of −1° C. to −7° C.; holding the UHG alcoholic beverage in the chilled holding tank for a predetermined amount of time such that the temperature of the UHG alcoholic beverage is within the range of −1° C. to −7° C., and wherein the temperature of the UHG alcoholic beverage is prevented from falling below a freezing point of the UHG alcoholic beverage; pumping the UHG alcoholic beverage from the chilled holding tank through a filtration system; and collecting the UHG alcoholic beverage filtered by the filtration system.

In some embodiments, a method for filtering and stabilizing UHG alcoholic beverages produced by a forward osmosis system is provided, comprising: conveying a UHG alcoholic beverage into a chilled holding tank set at a temperature within a range of −1° C. to −7° C., wherein the UHG alcoholic beverage is produced by the forward osmosis system and is between 24% and 50% alcohol by volume; maintaining the UHG alcoholic beverage in the chilled holding tank for a holding time set between 20 minutes and 24 hours such that the temperature of the UHG alcoholic beverage is within the range of −1° C. to −7° C., and wherein the temperature of the UHG alcoholic beverage is prevented from falling below a freezing point of the beverage; pumping, after expiration of the holding time, the UHG alcoholic beverage from the chilled holding tank through a multi-stage filtration system comprising filters arranged in an order progressing from coarse particle size filtration elements to fine particle size filtration elements, wherein the UHG alcoholic beverage contains haze compounds prior to entering the filtration system, and wherein filtration system removes the haze compounds from the UHG alcoholic beverage; and collecting, via a storage tank, the UHG alcoholic beverage pumped through the multi-stage filtration system.

In some embodiments, a system for filtering and stabilizing a UHG alcoholic beverage is provided, comprising: a feed stream providing the UHG alcoholic beverage from a forward osmosis system; a chilled tank set at a temperature within a range of −1° C. to −7° C., wherein the chilled tank holds the UHG alcoholic beverage received from the feed stream for a predetermined amount of time such that the temperature of the UHG alcoholic beverage is within the range of −1° C. to −7° C., and wherein the temperature of the UHG alcoholic beverage is prevented from falling below a freezing point of the beverage while being held in the chilled tank; a filtration system comprising a series of filter elements arranged in a fluid flow path; a pump that conveys the UHG alcoholic beverage from the chilled tank after expiration of the predetermined amount of time through the filtration system via the fluid flow path; and a collection tank that stores the UHG alcoholic beverage pumped through the filtration system.

In some embodiments, a system for filtering and stabilizing a UHG alcoholic beverage is provided, comprising: a feed stream providing the UHG alcoholic beverage, wherein the UHG alcoholic beverage is prepared by a forward osmosis subcomponent to receive as an input, a very-high gravity alcoholic beverage and a draw solution and, via forward osmosis, output an ultra-high gravity alcoholic beverage having a greater alcohol by volume percentage than the very-high gravity alcoholic beverage and spent draw solution; a chilled tank set at a temperature within a range of −1° C. to −7° C., wherein the chilled tank holds the UHG alcoholic beverage received from the feed stream for a predetermined amount of time such that the temperature of the UHG alcoholic beverage is within the range of −1° C. to −7° C.; a filtration system comprising a series of filter elements arranged in a fluid flow path; a pump that conveys the UHG alcoholic beverage from the chilled tank after expiration of the predetermined amount of time through the filtration system via the fluid flow path; and a collection tank that stores the UHG alcoholic beverage pumped through the filtration system.

In some embodiments, a method for filtering and stabilizing a UHG alcoholic beverage is provided, comprising: receiving UHG alcoholic beverage from a forward osmosis system, wherein the forward osmosis system comprises: a reverse osmosis subcomponent to receive high gravity alcoholic beverage and output a very-high gravity alcoholic beverage having a greater alcohol by volume percentage than the high gravity alcoholic beverage; and a forward osmosis subcomponent to receive as an input, the very-high gravity alcoholic beverage and a draw solution and, via forward osmosis, output the UHG alcoholic beverage having a greater alcohol by volume percentage than the very-high gravity alcoholic beverage and spent draw solution; introducing the UHG alcoholic beverage into a chilled holding tank set at a temperature within a range of −1° C. to −7° C., wherein the temperature range is above a freezing point of the UHG alcoholic beverage; holding the UHG alcoholic beverage in the chilled holding tank for a predetermined amount of time such that the temperature of the UHG alcoholic beverage is within the range of −1° C. to −7° C.; pumping the UHG alcoholic beverage from the chilled holding tank through a filtration system; and collecting the UHG alcoholic beverage filtered by the filtration system.

It should be appreciated that any of the ranges (e.g., temperature ranges, alcohol by volume ranges, etc.) described herein are intended to include any number associated with the upper limit, the lower limit, and/or any of the numbers therebetween.

Additional features and advantages are described herein and will be apparent from the following Description and the figures.

DETAILED DESCRIPTION

Figure 1:
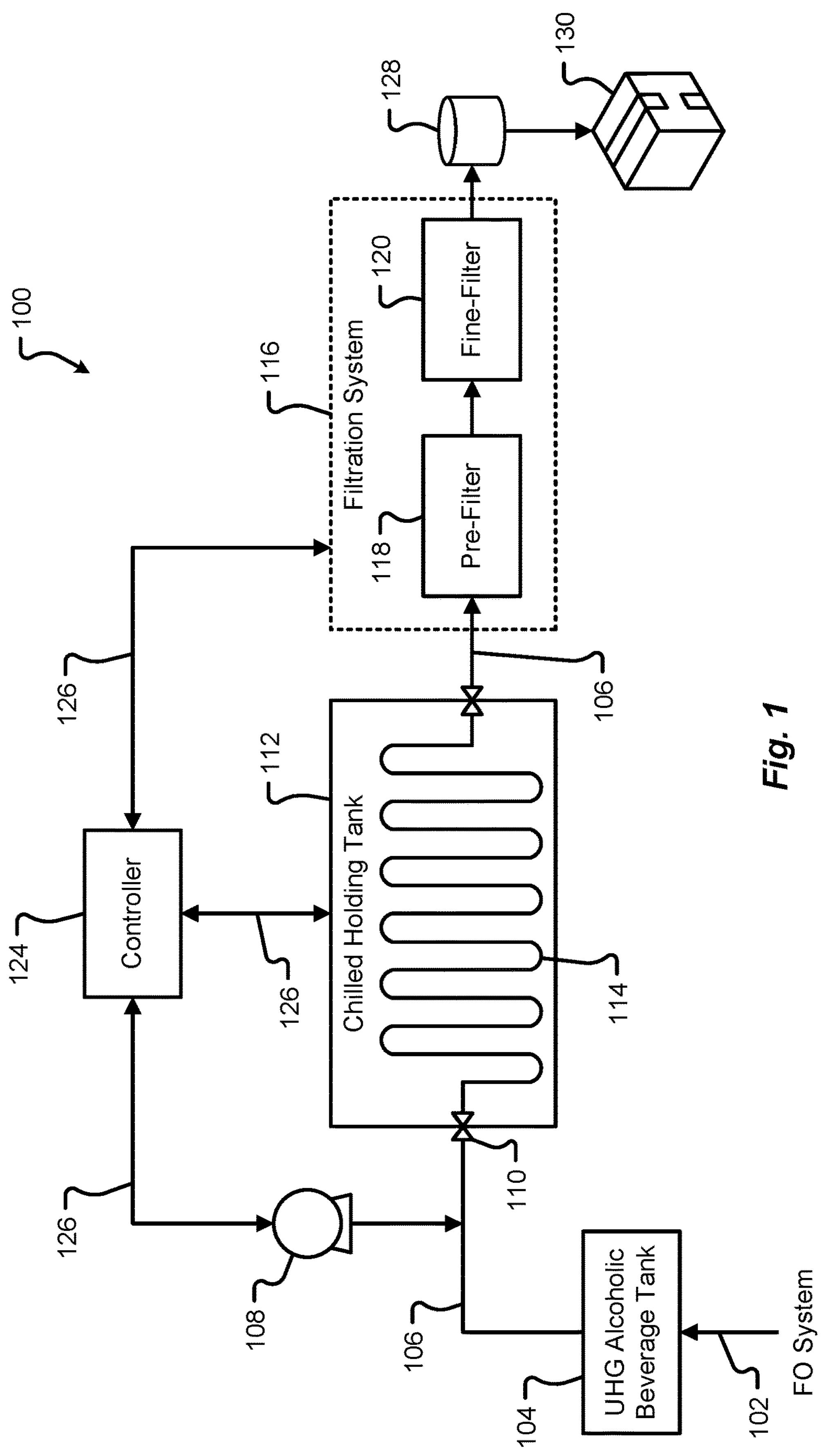
FIG. 1 is a block diagram of a post dewatering filtration system in accordance with embodiments of the present disclosure.

Embodiments of the present disclosure will be described in connection with filtration and stabilization methods and systems provided after an amount of water has been removed from a UHG alcoholic beverage. As described herein, removing an amount of water content in alcohol-based beverages may increase the overall gravity of the resultant dewatered alcoholic beverage. The terms "alcoholic beverage," "alcohol-based beverage(s)," "alcohol fluid(s)," "alcohol solution(s)," and the like, may be used interchangeably herein to refer to any beer, lager, stout, ale, porter, fermented malt beverage, cider (e.g., apple, pear, etc.), alcoholic malt base, etc., and/or combination thereof. In addition, the terms "high gravity," or "HG," "very-high gravity," or "VHG," and "ultra-high gravity," or "UHG," may be used herein to refer to a relative strength of the alcoholic beverage compared to water. For instance, a UHG beer may have a relative strength or approximately 24% to 50% ABV (and a greater quantity of dissolved solids in the water remaining in the alcoholic beverage than that of a VHG beer), a VHG beer may have a relative strength of approximately 14.1% to 23.9% (and a greater quantity of dissolved solids in the water remaining in the alcoholic beverage than that of an HG beer) and an HG beer may have a relative strength of approximately 5% to 14% ABV, and so on. In some embodiments, the UHG beer may have a relative strength of approximately 41% to 50% ABV. As can be appreciated, the UHG beer has a greater amount of alcohol remaining in the alcoholic beverage than that of a VHG beer, a VHG beer has a greater amount of alcohol remaining in the alcoholic beverage than that of an HG beer, and so on. As used herein, the gravity or ABV of the alcoholic beverage may be defined and measured in accordance with Original Gravity as described, at least, by the American Society of Brewing Chemists ("ASBC") method 4.E.

As previously described, removing water content in alcohol-based beverages increases the likelihood of solid constituents coming together and forming agglomerates of various sizes. These solid constituents may form a temporary or permanent haze in either or both of the UHG alcoholic beverage or the reconstituted sales gravity form of the alcohol (e.g., final consumable product, etc.). These solid constituents may be referred to herein as "haze compounds." The "hazy" or "cloudy" appearance attributed to the agglomeration of the solid constituents, in most cases, are not desired and may cause a shortened shelf life of the UHG alcoholic beverage. Embodiments of the present disclosure describe a post dewatering method and system that treats the UHG alcoholic beverage (e.g., beer, cider, malt beverage, etc.) to provide product clarity and ensure physical stability to the end of the shelf life of the UHG alcoholic beverage. Beer haze is principally caused by a coagulation of protein and polyphenols, with some further contribution from complex carbohydrates (e.g., xylans, pentosans, and beta glucan) and even minerals in extreme cases. Beer haze may be measured in Formazin Turbidity Units ("FTU") according to the ASBC method Beer 27. An measurement of less than 35 FTU may correspond to a "brilliant" (e.g., clear, bright, etc.) alcoholic beverage and a measurement of greater than 140 FTU may correspond to a "hazy" (e.g., cloudy) alcoholic beverage.

Referring to FIG. 1, a block diagram of a UHG post dewatering filtration system 100 is in accordance with embodiments of the present disclosure. UHG post dewatering filtration system 100 may include a chilled holding tank 112 and a filtration system 116 that is configured to reduce the temperature of incoming UHG alcoholic beverage and passes the reduced temperature UHG alcoholic beverage through a series of filters 118, 120. In some embodiments, the UHG alcoholic beverage may be conveyed along one or more fluid lines 106. The fluid lines 106 may comprise one or more pipes, tubes, hoses, gates, valves, and/or the like. In one embodiment, the fluid lines 106 may be pressurized to pump and/or otherwise convey UHG alcoholic beverage through the post dewatering filtration system 100.

The UHG alcoholic beverage may be provided via an infeed stream 102. The infeed stream 102 may correspond to the exit stream of a dewatering system, such as a forward osmosis (FO), and/or a combination reverse osmosis (RO)/FO system. In one embodiment, the UHG alcoholic beverage provided via the infeed stream 102 may correspond to a "rough" dewatered alcohol that has a percentage of alcohol by volume (ABV) between, and including, 24% to 50% ABV. Reaching an ABV above 24% may require the UHG alcoholic beverage to be processed using an FO system and/or a combination RO/FO system, as described herein. Utilizing a conventional RO process alone may only provide a limited ABV for a dewatered alcoholic beverage (e.g., less than about 24%). For instance, UK Patent Application No. GB2134541A describes a method for concentrating an alcoholic beverage comprising subjecting the beverage to RO to form a beverage concentrate. However, the final beverage concentrate described in this UK Patent Application only reached a concentration of 15.45% alcohol by weight. Any attempt to reach 24% ABV, 30% ABV, 40% ABV, or even 50% ABV, of the UHG alcoholic beverage without using an FO system, or a combination RO/FO, as described herein, would result in a time consuming and inefficient process, if at all possible. Further, as RO generated concentrate increases in ethanol content (e.g., beyond 20% ABV, etc.) a loss of solids in the RO generated concentrate may occur. This loss of solids results in a poor quality, or taste, of the beverage when reconstituted into the sales gravity form of the alcohol as the characteristics of the source of the RO concentrate have been removed.

At least one benefit to utilizing an FO process, or a combination RO/FO process, as described herein, includes producing a UHG alcoholic beverage (e.g., having an ABV between about 24% to 50%) that can be stabilized utilizing a cooling and filtration system. Stated another way, the UHG alcoholic beverage can be filtered and stabilized without the use of a centrifuge, or other harmful technique, which may subject the UHG alcoholic beverage to unacceptable shear forces and compromise the integrity of the UHG alcoholic beverage.

Centrifuges, also known as separators or decanters, are well known in the brewing industry, and have been in use for many years. For instance, U.S. Patent Publication No. US2001/0001676 A1 describes using a centrifuge to remove PVPP from beer and then subjecting the centrifuged beer to a filter for further processing. Similarly, European Patent No. EP2027244 B2 describes using a centrifuge and filter to obtain a solids free liquid medium that is further processed to reduce the alcohol content. However, the use of centrifuges has certain drawbacks. For instance, the use of a centrifuge does not itself stabilize the haze in brewed beer. Rather, a centrifuge exerts extreme centrifugal forces on the beer forcing certain solids therein (e.g., proteins, yeast, hops, flavor compounds, etc.) to move from a center of a spinning disc to an outermost radial portion thereof where the solids can be conveyed to a waste tank. These extreme centrifugal forces can subject the beer to unacceptable levels of hydrodynamic shear stress damaging cell viability, decreasing physical stability, and reducing the overall quality of the beer. Among other things, the post dewatering filtration system 100 and the successive filter elements of the filtration system 116 described herein provide an efficient means for stabilizing the haze in an UHG alcoholic beverage without damaging the final sales gravity form of the product.

The term "rough" as used herein may refer to an unfiltered alcohol that has turbidity, cloudiness, and/or haziness, or the potential to produce the same within a period of weeks. As provided herein, the level of turbidity may be proportional to the number of suspended haze compounds in the UHG alcoholic beverage (e.g., the greater the number of haze compounds in the UHG alcoholic beverage the greater the turbidity of the UHG alcoholic beverage, and vice versa).

The rough UHG alcoholic beverage may be conveyed to the chilled holding tank 112 along one or more fluid lines 106 (e.g., from the infeed stream 102 and/or a UHG alcoholic beverage tank 104). The chilled holding tank 112 may comprise a tank or fluid line that is temperature controlled by a chiller 114. The chiller 114 may comprise a glycol, or other, cooled system having one or more coolant lines that wrap around a portion of the chilled holding tank 112. In one embodiment, the chiller 114 may comprise a plate and frame heat exchanger. For instance, the UHG alcoholic beverage may flow on one side of the heat exchanger, while a coolant (e.g., glycol, etc.) may flow on the other side of the heat exchanger thereby cooling the rough UHG alcoholic beverage. In some embodiments, the fluid lines 106, the inlet, and/or the outlet of chilled holding tank 112 may be flow controlled by one or more valves 110 (e.g., solenoid valves, gate valves, butterfly valves, needle valves, combinations thereof, and/or the like). Actuation of the valves 110 may be controlled by the controller 124 (e.g., sending a control signal across bus 126). The bus 126 may correspond to a communications, power, and/or combination bus. Additionally or alternatively, the controller 124 may control a temperature and set point of the chiller 114. In some embodiments, the controller 124 may correspond to a proportional-integral-derivative (PID) controller, that continually monitors a temperature of the chilled holding tank 112 (e.g., via one or more temperature probes, thermocouples, etc.) and adjusts the cooling provided via the chiller 114. In some embodiments, the chiller 114 may be set to maintain the chilled holding tank 112 at a temperature range of, and including, −1° C. to −7° C. In one embodiment, the UHG alcoholic beverage contained in the chilled holding tank 112 may be cooled to a temperature between, and including, −1° C. to −7° C.

The UHG alcoholic beverage may be held in the chilled holding tank 112 for a predetermined amount of time to allow the UHG alcoholic beverage to reach a predetermined temperature in a temperature range (e.g., −1° C. to −7° C., etc.) that is above the freezing point for the UHG alcoholic beverage. In other words, the UHG alcoholic beverage should not be permitted to drop below a freezing point of the UHG alcoholic beverage. Holding the UHG alcoholic beverage at a temperature below its freezing point may cause the UHG alcoholic beverage to solidify (e.g., freeze, or substantially freeze, etc.). As can be appreciated, a substantially frozen or solid UHG alcoholic beverage could not be conveyed through the filtration system 116 or other components of the post dewatering filtration system 100. Further, where the UHG alcoholic beverage is beer, freezing may cause some of the beer solids to form insoluble complexes that will not dissolve again, in effect changing the characteristics of the beer. Accordingly, the temperature of the UHG alcoholic beverage is prevented from falling below a freezing point of the beverage while being held in the chilled holding tank or otherwise processed by the post dewatering filtration system 100. For example, the UHG alcoholic beverage may be held in the chilled holding tank 112 for a time period between, and including, 20 to 60 minutes, or even up to 24 hours. As can be appreciated, these times may be varied depending on the temperature of the UHG alcoholic beverage at the infeed stream 102. In some embodiments, the holding times may be increased when the UHG alcoholic beverage at infeed stream 102 is warmer than a predetermined threshold value or range. Additionally or alternatively, the holding times may be decreased when the UHG alcoholic beverage at infeed stream 102 is cooler than the predetermined threshold value or range.

In some cases, "holding" the UHG alcoholic beverage in the chilled holding tank 112 may include slowly pumping, moving, or conveying the UHG alcoholic beverage along one or more fluid lines inside the chilled holding tank 112. Stated another way, the UHG alcoholic beverage does not need to remain in a static, or unmoving, condition in the chilled holding tank 112 for the predetermined time period until the UHG alcoholic beverage reaches the predetermined temperature range (e.g., between and including −1° C. to −7° C., etc.).

Once sufficiently cooled, the reduced temperature UHG alcoholic beverage may be passed onto the filtration system 116. In one embodiment, the UHG alcoholic beverage may be pumped through one or more fluid line 106 via a pump 108. The filtration system 116 may include a series of filters 118, 120 arranged to progressively filter solids, ingredients, haze compounds, and/or their precursors from the UHG alcoholic beverage. The filters 118, 120 may include a pre-filter 118 having a first size of filter media and a fine-filter 120 having a second size of filter media. In one embodiment, the series of filters 118, 120 may comprise one or more filter elements having a fixed size of filter media. This fixed size of filter media may be coarse, fine, or some other predetermined size therebetween, for each filter element. In some embodiments, the first size of filter media may be coarser than the second size of filter media. For instance, the pre-filter 118 may include one or more "coarse" cellulose and/or polypropylene membranes having a 1.0 to 1.5 micron filtration size. The fine-filter 120 may include a ceramic and/or polysulfone membrane, a polypropylene filter, and/or a diatomaceous earth (e.g., viscose, silica, and/or perlite, etc.) depth filter. The fine-filter 120 may have a "fine" filtration size set smaller, or finer, than the pre-filter 118 (e.g., less than 1.0 micron filtration size, etc.). In some embodiments, the UHG alcoholic beverage may be pumped through the filters 118, 120 and into a storage tank 128, where the filtered and stable product 130 may be held prior to packaging. In some embodiments, the "coarse" filter media used in the pre-filter 118 may correspond to a filter media having a 0.6 to 0.8 micron filtration size and the "fine" filter used in the fine-filter 120 may correspond to a filter media having a 0.2 to 0.45 micron filtration size. In one embodiment, the "coarse" filter media used in the pre-filter 118 may correspond to a filter media having a 1.0 to 1.5 micron filtration size and the "fine" filter used in the fine-filter 120 may correspond to a filter media having a 0.45 to 0.8 micron filtration size.

Figure 2:
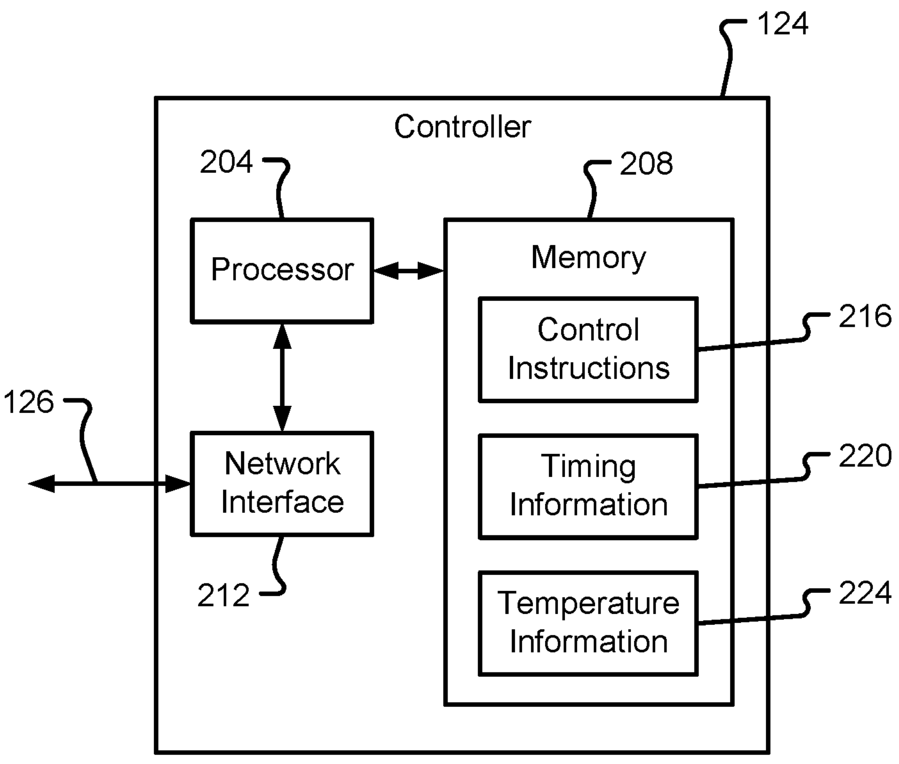
FIG. 2 is a block diagram depicting an illustrative controller in accordance with embodiments of the present disclosure.

FIG. 2 shows a block diagram depicting an illustrative controller 124 in accordance with embodiments of the present disclosure. The controller 124 may be part of the chilled holding tank 112, the filtration system 116, and/or any other component in the post dewatering filtration system 100. In some embodiments, the controller 124 may be separate and apart from the components of the post dewatering filtration system 100. In one embodiment, the controller 124 may comprise at least one of a programmable logic controller (PLC), synchronous link controller (SLC), industrial computer system, computer, mobile device, smartphone, combinations thereof, and/or the like. In any event, the controller 124 may include a processor 204, a memory 208, and a network interface 212.

The processor 204 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 120 may be provided as a microprocessor, Central Processing Unit (CPU), or plurality of microprocessors that are configured to execute the instructions sets 216 stored in memory 208. Upon executing the instructions stored in memory 208, the processor 204 enables various device and system control in the post dewatering filtration system 100 including, but in no way limited to, temperature control, chiller control, pump control, valve actuation (e.g., opening and closing, etc.), timers, PID control, etc., and/or combinations thereof.

The memory 208 may include any type of computer memory device or collection of computer memory devices. Non-limiting examples of the memory 208 may include Random Access Memory (RAM), Read Only Memory (ROM), flash memory, Electronically-Erasable Programmable ROM (EEPROM), Dynamic RAM (DRAM), etc. The memory 208 may be configured to store the instructions 216 depicted in FIG. 2 in addition to temporarily storing data for the processor 204 to execute various types of routines or functions. Although not depicted, the memory 208 may include instructions that enable the processor 204 to store and/or retrieve data in an automation or system control database.

The instruction sets stored in the memory 208 may include, but are in no way limited to, control instructions 216, temperature control instructions, timing control instructions, etc. Functions of the controller 124 enabled by these various instruction sets will be described in further detail herein. It should be appreciated that the instructions 216 depicted in FIG. 2 may be combined (partially or completely) with other instruction sets or may be further separated into additional and different instruction sets, depending upon configuration preferences for the controller 124. In any event, the particular instructions 216 depicted in FIG. 2 should not be construed as limiting embodiments described herein.

The control instruction set 216, when executed by the processor 204, may enable the controller 124 to manage one or more operations of the pump 108, valves 110, chilled holding tank 112, and/or the filtration system 116. The control instructions 216 may send signals (e.g., including commands, voltage, etc.) across the bus 126 via the network interface 212. In some embodiments, the control instructions 216 may control movement of the UHG alcoholic beverage through the post dewatering filtration system 100 by actuating valves 110, activating pumps 108, and/or other portions of the system 100. Additionally or alternatively, the control instructions 216 may refer to timing information 220 to set timers (e.g., incrementing or decrementing) for maintaining the UHG alcoholic beverage in the chilled holding tank 112. In one example, upon an expiration of the set timer, the controller 124 may send instructions to move the UHG alcoholic beverage from the chilled holding tank 112 in to the filtration system 116. In some embodiments, the control instructions 216 may refer to temperature information 224 to set, adjust, and/or maintain a temperature, or temperature range, of the chiller 114.

As provided above, the network interface 212 may provide the controller 124 with the ability to send and receive communication packets or the like over the bus 126. The network interface 212 may be provided as a network interface card (NIC), a network port, drivers for the same, and the like. Communications between the components of the controller 124 and other devices in the post dewatering filtration system 100 may all flow through the network interface 212 of the controller 124.

Figure 3:
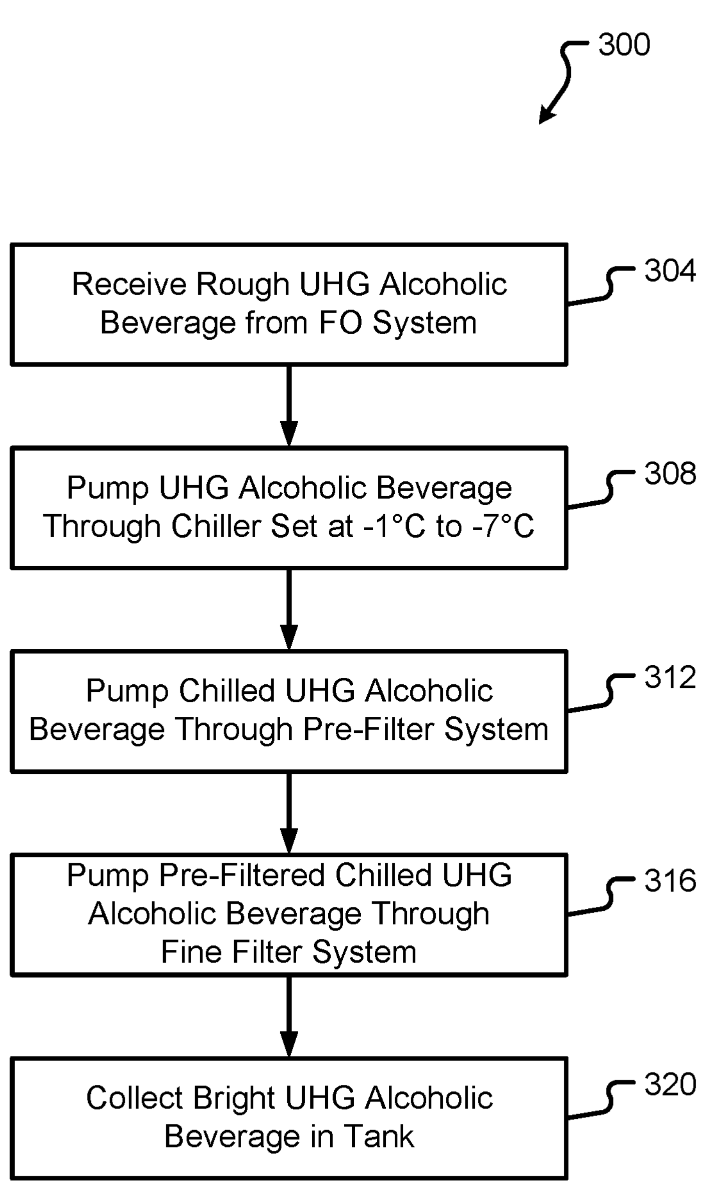
FIG. 3 is a flow diagram depicting a method of filtering and stabilizing a UHG alcoholic beverage in accordance with embodiments of the present disclosure.

Referring now to FIG. 3, a flow diagram depicting a method 300 of filtering and stabilizing UHG alcoholic beverage is shown in accordance with embodiments of the present disclosure. The method 300 begins by receiving a rough alcohol, or UHG alcoholic beverage, at a chilled holding tank 112 (step 304). The received UHG alcoholic beverage may be provided from an infeed stream 102, or pumped from a UHG alcoholic beverage tank 104, etc. In some embodiments, the dewatered alcoholic beverage may be continuously provided via a pipeline, directly from an FO or RO/FO dewatering system buffer tank, unit, or pipe.

Next, the method 300 continues by pumping the UHG alcoholic beverage through the chilled holding tank 112 and chiller 114 (step 308). In some embodiments, prior to chilling and filtering, the UHG alcoholic beverage may be gas washed. Gas washing may include decarbonating the UHG alcoholic beverage (e.g., beer, etc.) to remove carbon dioxide ($CO_2$). In one embodiment, another gas may be used to essentially "push" the $CO_2$ out of the UHG alcoholic beverage. Among other things, this process may significantly reduce the $H_2S$, or other sulfur compounds, in the incoming alcoholic beverages. Additionally or alternatively, the method 300 may include a pre-filtration step where nitrogen gas is forced, or expelled, through a sintered steel or ceramic candle (e.g., a disperser, etc.). The bubbles resulting from the pre-filtration step may be small in size and rise to the surface of a tank containing the UHG alcoholic beverage (e.g., where the tank is not under pressure).

The UHG alcoholic beverage may be pumped through one or more fluid lines 106 and the chilled holding tank 112 via at least one pump 108. In some embodiments, the controller 124 may control the pump 108 to move the UHG alcoholic beverage through the system 100 at various speeds or flow rates. In some embodiments, the chiller 114 may be set to maintain a predetermined temperature range of the UHG alcoholic beverage therein. For instance, the chiller 114 may be set to maintain a temperature range between, and including, −1° C. to −7° C. As another example, the chiller 114 may be set to maintain a temperature range between, and including, −3° C. to −8° C. In any event, the UHG alcoholic beverage should never be permitted to drop below a freezing point of the UHG alcoholic beverage. Such excessive cooling may cause the UHG alcoholic beverage to substantially freeze, or solidify, preventing the ability of the UHG alcoholic beverage to be conveyed through, or processed by, the post dewatering filtration system 100. Further, running the UHG alcoholic beverage through the post dewatering filtration system 100 at temperatures lower than those provided herein may result in the post dewatering filtration system 100 removing too many constituent elements (e.g., flavor compounds, etc.) of the UHG alcoholic beverage that could negatively affect the taste and quality of the UHG alcoholic beverage when reconstituted into the sales gravity form of the alcohol.

In some embodiments, the UHG alcoholic beverage may be held, or conveyed, in the chilled holding tank 112 at the predetermined temperature range for a period of time. Controlling the movement of the UHG alcoholic beverage in the chilled holding tank 112 for the period of time can ensure that the temperature of the UHG alcoholic beverage has been sufficiently reduced. For example, the UHG alcoholic beverage may be maintained in the chilled holding tank 112 for a period of time between 20 and 60 minutes. In one embodiment, the UHG alcoholic beverage may be maintained in the chilled holding tank 112 for a period of time between 20 minutes and 24 hours, or longer. In any event, the temperature of the UHG alcoholic beverage may be controlled and prevented from falling below a freezing point of the UHG alcoholic beverage.

Once chilled for the period of time, the method 300 continues by pumping, or otherwise conveying, the UHG alcoholic beverage through the pre-filter 118 of the filtration system 116 (step 312). The pre-filter 118 may correspond to a coarse initial filter, or filter set, that separates larger solids or particulate from the UHG alcoholic beverage. As provided herein the pre-filter 118 may comprise one or more cellulose and/or polypropylene membranes having a 1.0 to 1.5 micron filtration size. In some embodiments, the pre-filter 118 may control a flow of the UHG alcoholic beverage through the filtration system 116. For instance, the pre-filter 118 may reduce or eliminate turbulence from the conveyed fluid, providing a substantially laminar flow of the UHG alcoholic beverage entering the fine-filter 120.

The method 300 continues by pumping the pre-filtered chilled UHG alcoholic beverage through the fine-filter 120 of the filtration system 116 (step 316). The fine-filter 120 may comprise a ceramic and/or polysulfone membrane, a polypropylene filter, a diatomaceous earth (e.g., viscose, silica, and/or perlite, etc.) depth filter, screen, etc., and/or combinations thereof. In any event, the fine-filter 120 may comprise a filtration size, or screen, that is set to be smaller, or finer, than the filtration size, or screen, set for the pre-filter 118. The filters 118, 120 of the filtration system 116 may be disposed in an order, or arrangement, progressing from coarse particle size filtration elements to fine particle size filtration elements. The filtration system 116 may be configured to remove or filter solids, ingredients (e.g., proteins, tannins, carbohydrates, etc.), and/or other haze compounds (e.g., such as pectin in the case of cider, etc.) from the UHG alcoholic beverage passed therethrough. In one embodiment, the fine-filter may include a filter having a particulate retention size of 0.45 to 0.8 microns.

The filtered, or "bright," UHG alcoholic beverage may be collected in one or more storage tanks 128 (step 320). The term "bright" as used herein may refer to a filtered UHG alcoholic beverage that is substantially free of turbidity and/or is not cloudy and will not have the potential to become cloudy or hazy in the course of normal (e.g., temperature and light controlled) storage conditions over time (e.g., 90 days, or more, etc.), as described above (e.g., the filtered UHG alcoholic beverage may provide a substantially "brilliant" measurement according to ASBC method Beer 27, etc.). The filtered UHG alcoholic beverage may include a UHG alcoholic beverage without a number of haze compounds found in the "rough" UHG alcoholic beverage. With the haze compounds substantially removed, the filtered UHG alcoholic beverage may have an increased shelf life and overall stability than unfiltered UHG alcoholic beverages. For instance, the post dewatering filtration methods and systems described herein may increase the shelf life (e.g., when compared to an unfiltered UHG alcoholic beverage having an estimated 1-month shelf life, etc.) to three months, six months, or even more. Additionally or alternatively, the filtered dehydrate described herein may have a much lower propensity to agglomeration or separation than an untreated UHG alcoholic beverage. As can be appreciated, at least one benefit to the treatment methods and systems described herein is the production of a stable UHG alcoholic beverage and the final consumable product produced therefrom, which may remain stable over time (e.g., over the course of three to six months, etc.) under normal storage conditions (e.g., at a room temperature of 22° C., refrigerated at 3° C. to 4° C., etc.). In some embodiments, a light lager alcoholic beverage may be in the 10 to 60 FTU based on the ASBC Method Beer 27 range fresh and would be considered stable if it the alcoholic beverage was measured below 100 FTU after three months.

Figure 4:
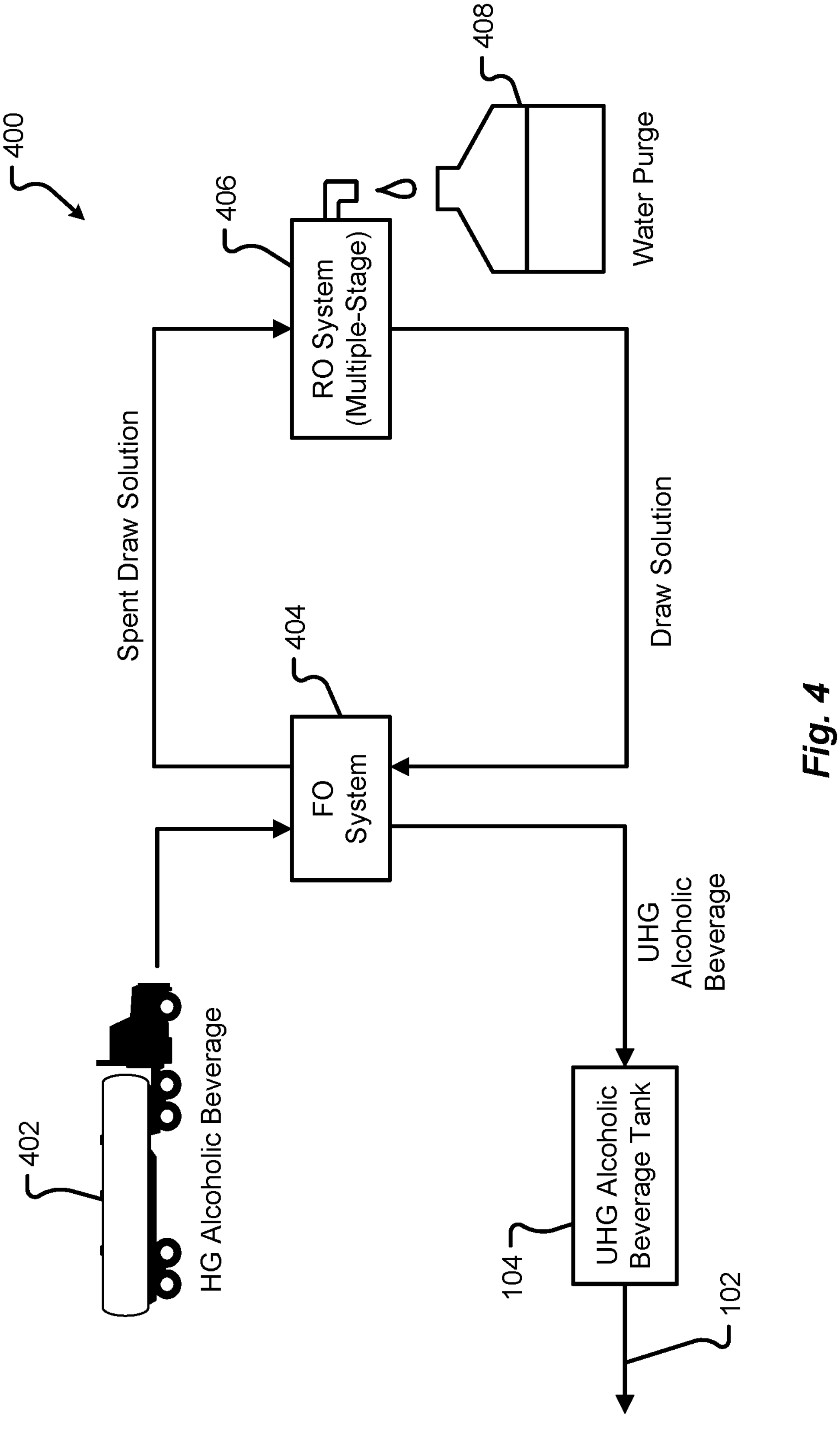
FIG. 4 is a block diagram of a system for dewatering alcoholic beverages using a combination forward osmosis and reverse osmosis system in accordance with embodiments of the present disclosure.

Referring to FIG. 4, a block diagram of a system 400 for removing an amount of water from an alcoholic beverage is shown in accordance with embodiments of the present disclosure. In some embodiments, the HG alcoholic beverage 402 may be provided to a forward osmosis (FO) system 404 to produce a UHG alcoholic beverage. In some embodiments, the HG alcoholic beverage 402 may be provided via one or more fluid lines, pipes, tanks, or the like. In one embodiment, the HG alcoholic beverage may be pumped, or otherwise conveyed, along a fluid line from a manufacturing source.

As shown in FIG. 1, the FO system 404 may utilize a draw solution to provide the necessary (reduced) osmotic pressure within the FO system 404. The FO system 404 may correspond to an FO filtration device containing one or more sets, or banks, of FO filter membranes. In the FO system 404, one side of a filter membrane (e.g., a semipermeable membrane, and/or a series of semipermeable membranes, etc.) may be contacted with the HG alcoholic beverage 402 to be dewatered and the other side of the filter membrane may be contacted with a draw solution that results in "pulling" at least some of the water out of the HG alcoholic beverage 402 through the filter. In some embodiments, the FO system 404 may be configured to handle a desired volumetric flow through the system 404 to accommodate desired production requirements. For example, the FO system 404 may comprise one or more FO membranes that provide a flow path for the HG alcoholic beverage 402 to optimize dewatering and desired throughput. The flow path may include a serpentine pattern, or any other type of tortuous flow, path in which a surface area of the FO membrane in contact with both the HG alcoholic beverage stream and the draw solution ensures a desired level of HG alcoholic beverage 402 stream dewatering. It is also contemplated that the FO system 404 could include a plurality of FO filters arranged in series or in parallel to address desired throughput production requirements.

The HG alcoholic beverage 402 stream and draw solution stream may be pressurized to provide the desired flow rate through the FO system 404. Accordingly, one or more pumps can be used for pressuring the respective streams. Alternatively, one or both of the streams can be gravity fed through the FO system 404 in which the streams have sufficient pressure heads to flow through the system 404.

The permeate water and draw solution define a spent draw solution that may be subsequently transferred to an RO system 406 for recycling, in which the spent draw solution is treated to remove the excess water content. In some embodiments, the excess water removed may be collected (e.g., via a tank, pipe, or other fluid line) at a water purge 408. The UHG alcoholic beverage, produced via the FO system 404, may be ready for the post dewatering filtration system 100 (e.g., via the infeed stream 102, etc.). In one embodiment, the UHG alcoholic beverage may have a reduced water content such that the UHG alcoholic beverage has an ABV range between, and including, approximately 24% to 50%. In some embodiments, the UHG alcoholic beverage may have an ABV range between, and including, approximately 41% to 50%.

The spent draw solution may be returned to its original strength for reuse which may be achieved by passing the water and draw solution through a cascading set of RO stages. In a first RO stage, the retentate solution from the first RO stage may be transported to another RO filtration stage. The retentate solution from the second RO stage may be transported to yet another RO filtration stage, and so on. This cascading or serial treatment of the spent draw solution is continued until the resultant solution has the desired water content amount. This resultant solution can then be used again in the FO filtration in the FO system 104. In some embodiments, the permeate stream from each RO stage may be returned to a previous RO filtration stage that has a similar water content so that there is a continual circulation of the draw solution until treated to a desired water content amount.

In some embodiments, the HG alcoholic beverage 402 may be pre-treated, or preconditioned, to better place the HG alcoholic beverage 402 in a condition to be dewatered. For example, it may be desired to remove dissolved oxygen in the HG alcoholic beverage 402. This can be accomplished by use of nitrogen purged fluid lines through which the HG alcoholic beverage 402 passes. As the HG alcoholic beverage 402 passes through the fluid lines that are purged with the nitrogen gas, dissolved oxygen is removed from the HG alcoholic beverage 402.

In some embodiments, the HG alcoholic beverage 402 supplied to the FO system 404 may be physically stabilized (e.g., prior to dewatering, etc.). In some embodiments, the HG alcoholic beverage 402 may be "chill proofed" prior to entering the FO system 404. In any event, physical stabilization may be obtained by the selective addition of any one or more of tannic acid, silica gels (e.g., silica xerogel, silica hydrogel, or the like), PVPP treatment, proteolytic enzyme, pectinase enzyme and/or cold treatment, holding the HG alcoholic beverage 402 at a temperature of to −1° C. to −7° C. for a predetermined period of time, etc., and/or combinations thereof.

The treated HG alcoholic beverage 402 stream exits the FO system 404 downstream as the UHG alcoholic beverage. The UHG alcoholic beverage may then be conveyed to the post dewatering filtration system 100 via the infeed stream 102.

When the UHG alcoholic beverage is to be prepared for consumption, a metered amount of water may be added back to the UHG alcoholic beverage, along with desired carbonation (e.g., carbonated water, etc.). In this manner, the UHG alcoholic beverage can be shipped and transported with a certain amount of water removed thereby reducing the overall weight of the product and, prior to consumption, the product can be rehydrated and/or carbonated.

Figure 5:
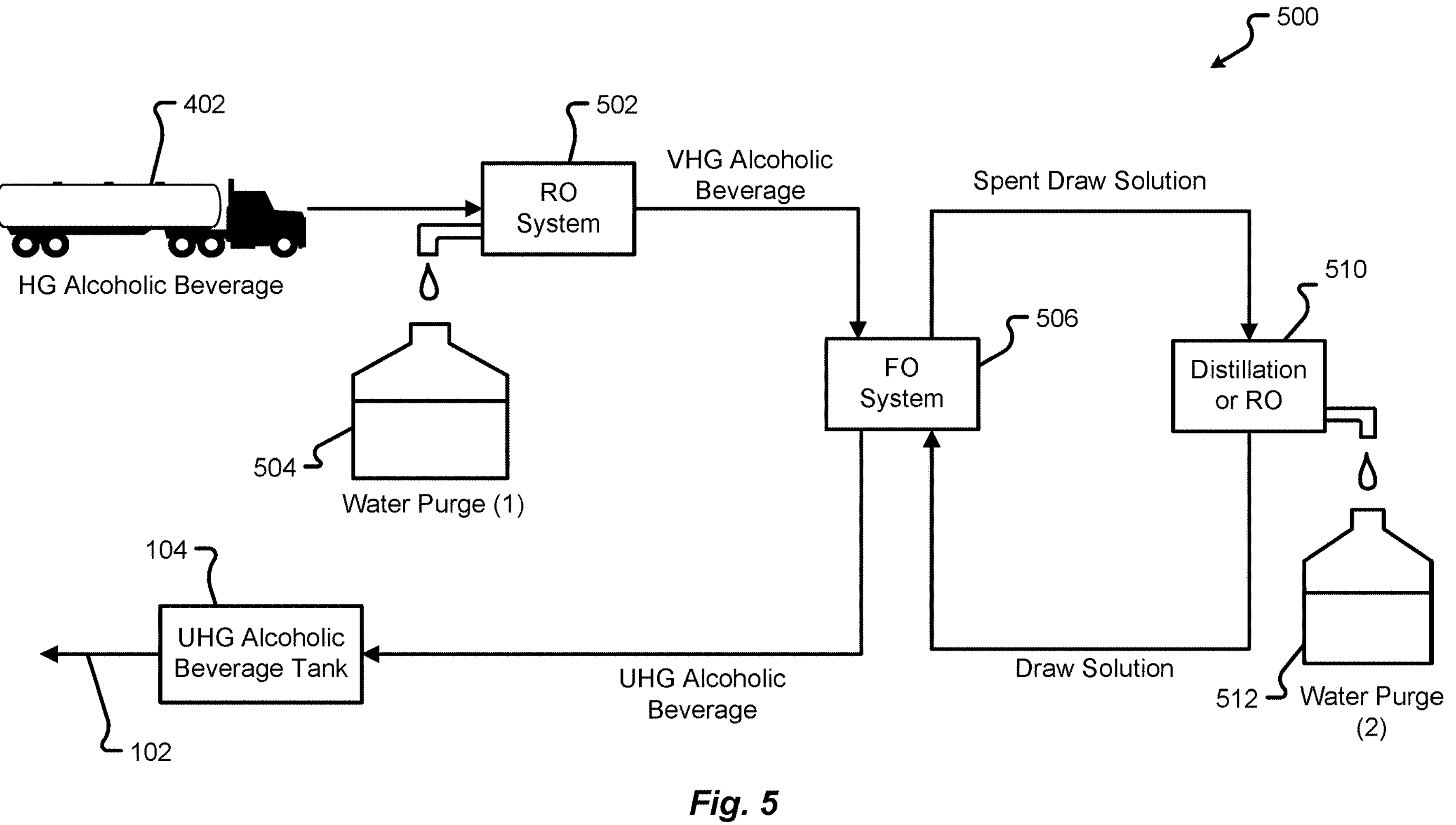
FIG. 5 is a block diagram of a system for dewatering alcoholic beverages using a reverse osmosis and forward osmosis system in accordance with embodiments of the present disclosure.

FIG. 5 is a block diagram of a system 500 for efficiently removing an amount of water from a supplied alcoholic beverage (e.g., an HG alcoholic beverage 402 and a VHG alcoholic beverage, etc.) in accordance with embodiments of the present disclosure. In one embodiment, an HG alcoholic beverage 402 stream, comprising an ABV between, and including, 5% to 14%, may be provided to the RO system 502 via one or more fluid lines. In some embodiments, the RO system 502 may provide an initial water content removal operation on the HG alcoholic beverage 402 supplied thereto. For instance, the HG alcoholic beverage 402 may be conveyed, under pressure (e.g., pumped, etc.), to the RO system 502 (e.g., an initial dewatering station in the system 500) comprising one or more semipermeable membranes. The semipermeable membranes may serve to remove water content from the HG alcoholic beverage 402. Water removed by the RO system 502 may be collected from one side of the one or more semipermeable membranes in a water purge 504 tank, or fluid line. In some embodiments, this water may be reused, recycled, or packaged, etc. Upon removing water content from the HG alcoholic beverage 402, the RO system 502 provides a VHG alcoholic beverage on the other side of the one or more semipermeable membranes. In some embodiments, this VHG alcoholic beverage may have an ABV between, and including, 14.1% to 23.9%. This VHG alcoholic beverage may then be fed into the FO system 506 (e.g., a secondary dewatering station in the system 500), which then produces a UHG alcoholic beverage, for example, having an ABV of approximately 24% to 50%. In some embodiments, the UHG beer may have a relative strength of approximately 41% to 50% ABV, and any value therein and therebetween. The UHG alcoholic beverage, produced via the FO system 506, may be ready for the post dewatering filtration system 100 (e.g., via the infeed stream 102, etc.). In some embodiments, the FO system 506 described in conjunction with FIG. 5 may be similar, if not identical, to the FO system 404 described in conjunction with FIG. 4.

In one embodiment, the FO system 506 may utilize a draw solution to provide the necessary (reduced) osmotic pressure within the FO system 506. The spent draw solution may be conveyed, or otherwise provided, to a distillation or subsequent RO system 510. The distillation or RO system 510 may dewater the spent draw solution, and excess water may be drawn off in the second water purge 512. The draw solution exiting the distillation or RO system 510 may then be reintroduced into the FO system 506. In some embodiments, this recycling process of draw solution between the distillation or RO system 510 and the FO system 506 may be the same or similar to the draw solution recycling process described in conjunction with FIG. 4 (e.g., between the RO system 406 and the FO system 404, etc.). In any event, the purged water from the first water purge 504 and/or the second water purge 512 may be reused, recycled, conveyed, or directed elsewhere.

Figure 6:
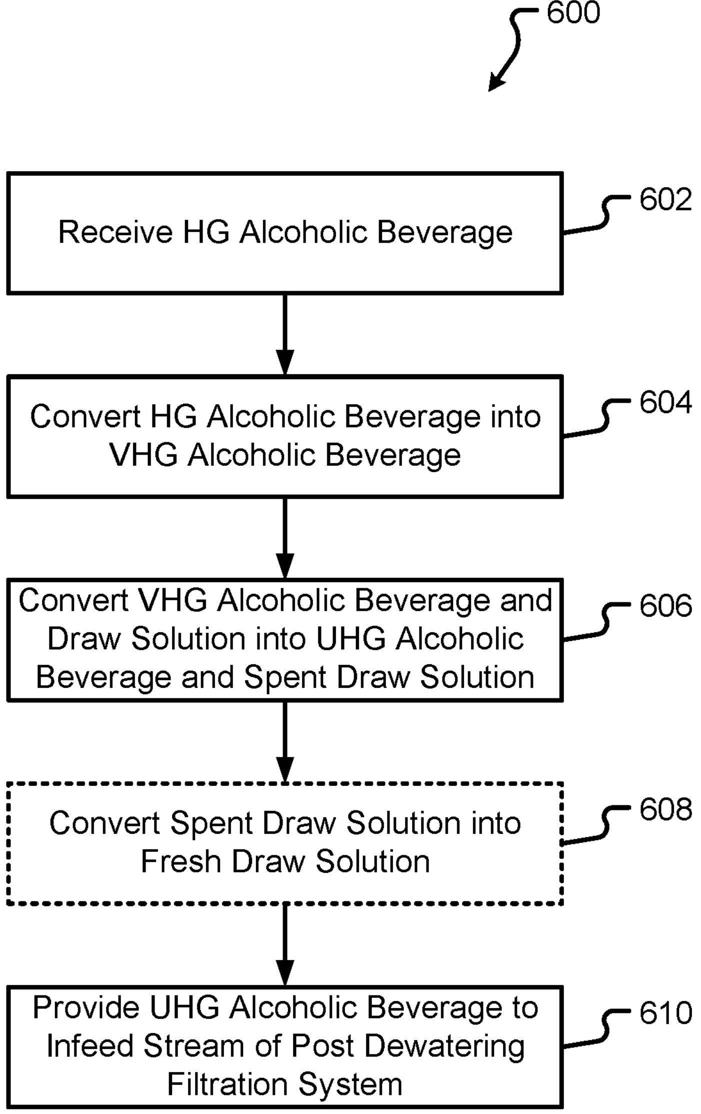
FIG. 6 is a flow diagram depicting a method of dewatering alcoholic beverages in accordance with embodiments of the present disclosure.

FIG. 6 is a flow diagram depicting a method 600 of dewatering alcoholic beverages in accordance with embodiments of the present disclosure. In one embodiment, method 600 begins with the receipt of an HG alcoholic beverage (step 602). The HG alcoholic beverage 402 may be provided from an infeed stream, or pumped from HG alcoholic beverage 402 tank, etc. In one embodiment, the HG alcoholic beverage 402 may be continuously provided via a pipeline, for example, directly from an alcoholic beverage supply source. In some embodiments, the HG alcoholic beverage 402 may be received via truck, railcar, pipeline, on-site storage, or other vessel. In some cases, the HG alcoholic beverage 402 may have an ABV of 5% to 14%.

Next, the HG alcoholic beverage 402 is conveyed (e.g., pumped, moved, etc.) along a fluid line to an initial dewatering system. The HG alcoholic beverage 402 may be conveyed to an RO system 502 where the HG alcoholic beverage 502 is converted into a VHG alcoholic beverage (step 604). For example, the RO system 502 may separate the HG alcoholic beverage 502 into separate streams. The streams may comprise a VHG alcoholic beverage stream and a removed water stream. In some embodiments, the water removed via the RO system 502 may be collected in a first water purge 504. As provided above, this water may be reused, recycled, and/or packaged. The VHG alcoholic beverage stream may have an ABV between, and including, 14.1% to 23.9%.

The method 600 continues by conveying (e.g., pumping, moving, etc.) the VHG alcoholic beverage along a fluid line to the FO system 506 (step 606). In step 606, the VHG alcoholic beverage and a draw solution are converted into a UHG alcoholic beverage and spent draw solution, respectively. This step can increase the gravity of the VHG alcoholic beverage, having an ABV of 14.1% to 23.9%, to a UHG alcoholic beverage, having an ABV of 24% to 50%, 41% to 50%, or greater. The conversion of the VHG alcoholic beverage into a UHG alcoholic beverage may be similar, if not identical, to the process described in conjunction with the FO system 506 of FIG. 5.

In some embodiments, the spent draw solution may be converted into a fresh draw solution (e.g., via a distillation and/or RO system 210) for reintroduction into the FO system 506 (step 608). Among other things, this process provides an efficient use of water in the system and allows for excess water to be reused, recycled, and/or packaged.

The method 600 may continue by providing the UHG alcoholic beverage to the post dewatering filtration system 100 via the infeed stream 102 (step 610). In some embodiments, this step may include conveying the UHG alcoholic beverage to the dewatered alcoholic beverage tank 104 or directly to the chilled holding tank 112 via the fluid line 106. Here, the method 300 described in conjunction with FIG. 3 may be performed to filter and stabilize the UHG alcoholic beverage. Stated another way, after producing the UHG alcoholic beverage via FO, the method 600 may continue at step 304 of the method of filtering and stabilizing UHG alcoholic beverage 300 described above.

In some embodiments, the process 600 described above may loop continuously, as long as step 602 is provided with an HG alcoholic beverage stream, and as long as the spent draw solution/fresh draw solution exists.

Any of the steps, functions, and operations discussed herein can be performed continuously and automatically.

The exemplary systems and methods of this disclosure have been described in relation to UHG alcoholic beverages (e.g., beer, cider, malt beverages, etc.) and post dewatering filtering and stabilizing of the same. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for filtering and stabilizing an ultra-high gravity (UHG) alcoholic beverage, comprising: receiving the UHG alcoholic beverage from a forward osmosis (FO) system; introducing the UHG alcoholic beverage into a chilled holding tank set at a temperature within a range of −1° C. to −7° C.; holding the UHG alcoholic beverage in the chilled holding tank for a predetermined amount of time such that the temperature of the UHG alcoholic beverage is within the range of −1° C. to −7° C., and wherein the temperature of the UHG alcoholic beverage is prevented from falling below a freezing point of the UHG alcoholic beverage; pumping the UHG alcoholic beverage from the chilled holding tank through a filtration system; and collecting the UHG alcoholic beverage filtered by the filtration system.

Aspects of the above method include wherein the predetermined amount of time is between 20 minutes and 24 hours. Aspects of the above method include wherein the UHG alcoholic beverage is between 24% and 50% alcohol by volume. Aspects of the above method include wherein the filtration system comprises at least one of: a pre-filter comprising at least one coarse filter element; and/or a fine-filter comprising at least one fine filtration element. Aspects of the above method include wherein the pre-filter comprises a cellulose membrane or a polypropylene membrane comprising an average particle filtration size between 1.0 and 1.5 microns. Aspects of the above method include wherein the fine-filter comprises one or more of a ceramic filter membrane, a polysulfone membrane, a polypropylene filter, and/or a viscose, silica, or perlite diatomaceous earth depth filter having an average particle filtration size between 0.45 and 0.8 microns. Aspects of the above method include wherein the UHG alcoholic beverage is a beer, cider, or fermented malt beverage. Aspects of the above method include wherein the UHG alcoholic beverage includes haze compounds prior to entering the filtration system, and wherein filtration system removes the haze compounds and haze precursors from the UHG alcoholic beverage. Aspects of the above method include wherein the FO system comprises: a reverse osmosis (RO) subcomponent to receive a high gravity alcoholic beverage and output a very-high gravity alcoholic beverage having a greater alcohol by volume percentage than the high gravity alcoholic beverage; and an FO subcomponent to receive as an input, the very-high gravity alcoholic beverage and a draw solution and, via forward osmosis, output the UHG alcoholic beverage having a greater alcohol by volume percentage than the very-high gravity alcoholic beverage and spent draw solution.

Embodiments include a method for filtering and stabilizing ultra-high gravity (UHG) alcoholic beverages produced by a forward osmosis (FO) system, comprising: conveying a UHG alcoholic beverage into a chilled holding tank set at a temperature within a range of −1° C. to −7° C., wherein the UHG alcoholic beverage is produced by the FO system and is between 24% and 50% alcohol by volume; maintaining the UHG alcoholic beverage in the chilled holding tank for a holding time set between 20 minutes and 24 hours such that the temperature of the UHG alcoholic beverage is within the range of −1° C. to −7° C., and wherein the temperature of the UHG alcoholic beverage is prevented from falling below a freezing point of the beverage; pumping, after expiration of the holding time, the UHG alcoholic beverage from the chilled holding tank through a multi-stage filtration system comprising filters arranged in an order progressing from coarse particle size filtration elements to fine particle size filtration elements, wherein the UHG alcoholic beverage contains haze compounds prior to entering the filtration system, and wherein filtration system removes the haze compounds from the UHG alcoholic beverage; and collecting, via a storage tank, the UHG alcoholic beverage pumped through the multi-stage filtration system.

Aspects of the above method include wherein the multi-stage filtration system comprises at least one of: a pre-filter comprising one or more of a cellulose membrane and/or a polypropylene membrane having an average particle filtration size between 1.0 and 1.5 microns; and/or a fine-filter comprising one or more of a ceramic filter membrane, a polysulfone membrane, a polypropylene filter, and/or a diatomaceous earth depth filter having an average particle filtration size between 0.45 and 0.8 microns. Aspects of the above method include wherein the UHG alcoholic beverage is between 41% and 50% alcohol by volume. Aspects of the above method include wherein producing the UHG alcoholic beverage via the FO system comprises: processing, via reverse osmosis (RO), a high gravity alcoholic beverage to produce a very-high gravity alcoholic beverage, wherein the very-high gravity alcoholic beverage comprises a greater alcohol by volume percentage than the high gravity alcoholic beverage; and processing, via FO, the very-high gravity alcoholic beverage processed via RO, to produce the UHG alcoholic beverage, wherein the UHG alcoholic beverage comprises a greater ABV percentage than the very-high gravity alcoholic beverage.

Embodiments include a system for filtering and stabilizing a UHG alcoholic beverage, comprising: a feed stream providing the UHG alcoholic beverage from a forward osmosis system; a chilled tank set at a temperature within a range of −1° C. to −7° C., wherein the chilled tank holds the UHG alcoholic beverage received from the feed stream for a predetermined amount of time such that the temperature of the UHG alcoholic beverage is within the range of −1° C. to −7° C., and wherein the temperature of the UHG alcoholic beverage is prevented from falling below a freezing point of the beverage while being held in the chilled tank; a filtration system comprising a series of filter elements arranged in a fluid flow path; a pump that conveys the UHG alcoholic beverage from the chilled tank after expiration of the predetermined amount of time through the filtration system via the fluid flow path; and a collection tank that stores the UHG alcoholic beverage pumped through the filtration system.

Aspects of the above system include wherein the predetermined amount of time is between 20 minutes and 24 hours. Aspects of the above system include wherein the UHG alcoholic beverage is between 41% and 50% alcohol by volume. Aspects of the above system include wherein the UHG alcoholic beverage is between 24% and 50% alcohol by volume. Aspects of the above system include wherein the filtration system comprises at least one of: a pre-filter comprising at least one coarse filter element; and/or a fine-filter comprising at least one fine filtration element. Aspects of the above system include wherein the pre-filter comprises a cellulose membrane or a polypropylene membrane comprising an average particle filtration size between 1.0 and 1.5 microns. Aspects of the above system include wherein the fine-filter comprises one or more of a ceramic filter membrane, a polysulfone membrane, a polypropylene filter, and/or a diatomaceous earth depth filter having an average particle filtration size between 0.45 and 0.8 microns. Aspects of the above system include wherein the UHG alcoholic beverage is a beer, cider, or fermented malt beverage. Aspects of the above system include wherein the UHG alcoholic beverage includes haze compounds prior to entering the filtration system, and wherein filtration system removes the haze compounds and haze precursors from the UHG alcoholic beverage. Aspects of the above system further comprising: a controller coupled with the pump and a chiller of the chilled tank, comprising: a processor; and a memory coupled with and readable by the processor and storing therein a set of instructions that, when executed by the processor, causes the processor to: open an inlet valve of the chilled tank, wherein the UHG alcoholic beverage flows through the inlet valve into the chilled tank; initiate a timer for the predetermined amount of time upon receiving the UHG alcoholic beverage such that the temperature of the UHG alcoholic beverage reaches a temperature range of −1° C. to −7° C.; and open an exit valve of the chilled tank upon expiration of the predetermined amount of time and after the UHG alcoholic beverage reaches the temperature range of −1° C. to −7° C. Aspects of the above system include wherein the set of instructions further causes the processor to: start the pump after opening the exit valve of the chilled tank forcing the UHG alcoholic beverage through the filtration system Embodiments include a system for filtering and stabilizing a UHG alcoholic beverage, comprising: a feed stream providing the UHG alcoholic beverage, wherein the UHG alcoholic beverage is prepared by a forward osmosis subcomponent to receive as an input, a very-high gravity alcoholic beverage and a draw solution and, via forward osmosis, output an ultra-high gravity alcoholic beverage having a greater alcohol by volume percentage than the very-high gravity alcoholic beverage and spent draw solution; a chilled tank set at a temperature within a range of −1° C. to −7° C., wherein the chilled tank holds the UHG alcoholic beverage received from the feed stream for a predetermined amount of time such that the temperature of the UHG alcoholic beverage is within the range of −1° C. to −7° C.; a filtration system comprising a series of filter elements arranged in a fluid flow path; a pump that conveys the UHG alcoholic beverage from the chilled tank after expiration of the predetermined amount of time through the filtration system via the fluid flow path; and a collection tank that stores the UHG alcoholic beverage pumped through the filtration system.

Aspects of the above system include wherein the UHG alcoholic beverage is substantially 41% to 50% ABV. Aspects of the above system wherein the UHG alcoholic beverage is prepared without reverse osmosis. Aspects of the above system wherein the very-high gravity alcoholic beverage is prepared by reverse osmosis and fed to the forward osmosis subcomponent to produce the UHG alcoholic beverage. Aspects of the above system wherein the temperature of the beverage is prevented from falling below a freezing point of the UHG alcoholic beverage while being held in the chilled tank.

Embodiments include a method for filtering and stabilizing a UHG alcoholic beverage, comprising: receiving UHG alcoholic beverage from a forward osmosis system, wherein the forward osmosis system comprises: a reverse osmosis subcomponent to receive high gravity alcoholic beverage and output a very-high gravity alcoholic beverage having a greater alcohol by volume percentage than the high gravity alcoholic beverage; and a forward osmosis subcomponent to receive as an input, the very-high gravity alcoholic beverage and a draw solution and, via forward osmosis, output the UHG alcoholic beverage having a greater alcohol by volume percentage than the very-high gravity alcoholic beverage and spent draw solution; introducing the UHG alcoholic beverage into a chilled holding tank set at a temperature within a range of −1° C. to −7° C., wherein the temperature range is above a freezing point of the UHG alcoholic beverage; holding the UHG alcoholic beverage in the chilled holding tank for a predetermined amount of time such that the temperature of the UHG alcoholic beverage is within the range of −1° C. to −7° C.; pumping the UHG alcoholic beverage from the chilled holding tank through a filtration system; and collecting the UHG alcoholic beverage filtered by the filtration system.

Aspects of the above method include wherein the UHG alcoholic beverage received is substantially 24% to 50% ABV. Aspects of the above method include wherein the temperature of the UHG alcoholic beverage is prevented from falling below a freezing point of the UHG alcoholic beverage while being held in the chilled holding tank.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A method for filtering and stabilizing an ultra-high gravity (UHG) alcoholic beverage, comprising:

processing a high gravity (HG) alcoholic beverage having 5% to 14% ABV via reverse osmosis to form a very-high gravity (VHG) alcoholic beverage having a greater alcohol by volume percentage (ABV) than the HG alcoholic beverage;

processing the VHG alcoholic beverage and a draw solution via forward osmosis to form the UHG alcoholic beverage having a greater ABV and, via forward osmosis, output the UHG alcoholic beverage and spent draw solution;

receiving the UHG alcoholic beverage having 24% to 50% ABV;

introducing the UHG alcoholic beverage into a chilled holding tank set at a temperature within a range of −3° C. to −8° C.;

holding the UHG alcoholic beverage in the chilled holding tank for a predetermined amount of time such that the temperature of the UHG alcoholic beverage is within the range of −3° C. to −8° C., and wherein the temperature of the UHG alcoholic beverage is prevented from falling below a freezing point of the UHG alcoholic beverage;

pumping the UHG alcoholic beverage from the chilled holding tank through a prefilter of a filtration system, the prefilter including at least one coarse particle size filter;

pumping the UHG alcoholic beverage pre-filtered by the filtration system through a fine-filter of the filtration system; and collecting the UHG alcoholic beverage filtered by the prefilter and fine-filter of the filtration system.

2. The method of claim 1, wherein the predetermined amount of time is between 20 minutes and 24 hours.

3. The method of claim 2, wherein the UHG alcoholic beverage is between 41% and 50% alcohol by volume.

4. The method of claim 1, wherein the pre-filter comprises a cellulose membrane or a polypropylene membrane comprising an average particle filtration size between 1.0 and 1.5 microns.

5. The method of claim 4, wherein the fine-filter comprises one or more of a ceramic filter membrane, a polysulfone membrane, a polypropylene filter, and/or a viscose, silica, or perlite diatomaceous earth depth filter having an average particle filtration size between 0.45 and 0.8 microns.

6. The method of claim 5, wherein the UHG alcoholic beverage is a beer, cider, or fermented malt beverage.

7. The method of claim 6, wherein the UHG alcoholic beverage includes haze compounds prior to entering the filtration system, and wherein filtration system removes the haze compounds and haze precursors from the UHG alcoholic beverage.

8. The method of claim 1, wherein the VHG alcoholic beverage has 14.1% to 23.9% ABV.

9. A method for filtering and stabilizing ultra-high gravity (UHG) alcoholic beverages produced by a forward osmosis (FO) system, the method comprising:

processing, via reverse osmosis (RO), a high gravity (HG) alcoholic beverage to produce a very-high gravity (VHG) alcoholic beverage, wherein the VHG alcoholic beverage comprises a greater alcohol by volume percentage than the HG alcoholic beverage;

processing, via FO, the VHG alcoholic beverage processed via RO, to produce the UHG alcoholic beverage, wherein the UHG alcoholic beverage comprises a greater ABV percentage than the very-high gravity alcoholic beverage;

conveying the UHG alcoholic beverage into a chilled holding tank set at a temperature within a range of −3° C. to −8° C., wherein the UHG alcoholic beverage having 24% to 50% ABV;

maintaining the UHG alcoholic beverage in the chilled holding tank for a holding time set between 20 minutes and 24 hours such that the temperature of the UHG alcoholic beverage is within the range of −3° C. to −8° C., and wherein the temperature of the UHG alcoholic beverage is prevented from falling below a freezing point of the beverage;

pumping, after expiration of the holding time, the UHG alcoholic beverage from the chilled holding tank through a multi-stage filtration system comprising filters arranged in an order progressing from coarse particle size filtration elements to fine particle size filtration elements, wherein the UHG alcoholic beverage contains haze compounds prior to entering the filtration system, and wherein filtration system removes the haze compounds from the UHG alcoholic beverage; and collecting, via a storage tank, the UHG alcoholic beverage pumped through the multi-stage filtration system.

10. The method of claim 9, wherein the multi-stage filtration system comprises at least one of:

a pre-filter comprising one or more of a cellulose membrane and/or a polypropylene membrane having an average particle size filtration between 1.0 and 1.5 microns; and/or a fine-filter comprising one or more of a ceramic filter membrane, a polysulfone membrane, a polypropylene filter, and/or a diatomaceous earth depth filter having an average particle filtration size between 0.45 and 0.8 microns.

11. The method of claim 10, wherein the UHG alcoholic beverage is between 41% and 50% alcohol by volume.

* * * * *